US009733970B2

(12) United States Patent
Cropper et al.

(10) Patent No.: US 9,733,970 B2
(45) Date of Patent: Aug. 15, 2017

(54) PLACEMENT OF VIRTUAL MACHINES ON PREFERRED PHYSICAL HOSTS

(71) Applicant: International Business Machines Corporation, Armonk, NY (US)

(72) Inventors: Joseph W. Cropper, Rochester, MN (US); Jennifer D. Mulsow, Cedar Park, TX (US); Taylor D. Peoples, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/832,768

(22) Filed: Aug. 21, 2015

(65) Prior Publication Data
US 2017/0052805 A1     Feb. 23, 2017

(51) Int. Cl.
*G06F 9/455*      (2006.01)
*G06F 9/46*       (2006.01)
(Continued)

(52) U.S. Cl.
CPC .......... *G06F 9/45558* (2013.01); *G06F 9/455* (2013.01); *G06F 9/45533* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4875* (2013.01); *G06F 9/4881* (2013.01); *G06F 9/50* (2013.01); *G06F 9/505* (2013.01); *G06F 9/5005* (2013.01); *G06F 9/5027* (2013.01); *G06F 9/5033* (2013.01); *G06F 9/5044* (2013.01); *G06F 9/5055* (2013.01); *G06F 9/5083* (2013.01); *G06F 9/5088* (2013.01); *G06F 17/3053* (2013.01); *G06F 17/30489* (2013.01);
(Continued)

(58) Field of Classification Search
None
See application file for complete search history.

(56) References Cited

U.S. PATENT DOCUMENTS 8,230,069 B2    7/2012   Korupolu
2009/0292696 A1*   11/2009   Shuster ............. G06F 17/30867
(Continued)

OTHER PUBLICATIONS

Cropper et al., "Placement of Virtual Machines on Preferred Physical Hosts" U.S. Appl. No. 14/841,536, filed Aug. 31, 2015.
(Continued)

*Primary Examiner* — Charles Swift
(74) *Attorney, Agent, or Firm* — Martin & Associates, LLC; Bret J. Petersen (57) ABSTRACT

Placement of virtual machines on physical hosts is based on a preferred host list that may be generated from preferred host identifiers to more efficiently utilize system resources and serve the needs of different workloads. A host identifiers mechanism allows a system administrator to select preferred host identifiers for each virtual machine or a group of virtual machines. The host identifiers mechanism in conjunction with an optimizer periodically adjusts the placement of virtual machines according to the preferred host identifiers and consistent with optimization policies. Further, the preferred host identifiers may include a time component so that the preferred host resources can be periodically updated and can dynamically change over time.

14 Claims, 7 Drawing Sheets

(51) Int. Cl.
  G06F 15/173 (2006.01)
  H04L 29/08 (2006.01)
  G06F 17/30 (2006.01)
  G06F 9/48 (2006.01)
  G06F 9/50 (2006.01)
  H04L 12/24 (2006.01)

(52) U.S. Cl.
  CPC ............ *H04L 41/04* (2013.01); *H04L 41/145* (2013.01); *H04L 67/10* (2013.01); *G06F 2009/4557* (2013.01); *G06F 2009/45595* (2013.01)

(56) References Cited

U.S. PATENT DOCUMENTS

| | | | | |
|---|---|---|---|---|
| 2011/0214123 A1* | 9/2011 | Lublin | ............... | G06F 9/5055 718/1 |
| 2011/0219372 A1* | 9/2011 | Agrawal | ............ | G06F 9/45558 718/1 |
| 2012/0266166 A1* | 10/2012 | Farkas | ............... | G06F 9/45533 718/1 |
| 2013/0073730 A1* | 3/2013 | Hansson | ............... | G06F 9/5044 709/226 |
| 2013/0097296 A1* | 4/2013 | Gehrmann | ............ | G06F 9/4856 709/223 |
| 2013/0290511 A1* | 10/2013 | Tu | ........................ | G06F 9/5072 709/224 |
| 2013/0297964 A1* | 11/2013 | Hegdal | ............... | G06F 11/0712 714/2 |
| 2013/0304899 A1* | 11/2013 | Winkler | ................. | H04L 67/34 709/224 |
| 2014/0068609 A1* | 3/2014 | Breitgand | ........... | G06F 9/45533 718/1 |
| 2014/0165063 A1* | 6/2014 | Shiva | ..................... | G06F 21/57 718/1 |
| 2014/0282520 A1 | 9/2014 | Sabharwal | | |
| 2014/0317622 A1 | 10/2014 | Hegdal et al. | | |
| 2014/0331227 A1* | 11/2014 | Ahmad | ................ | G06F 9/5033 718/1 |
| 2014/0372790 A1* | 12/2014 | Antony | ................... | G06F 9/455 714/4.11 |
| 2015/0160972 A1* | 6/2015 | Yu | ........................ | G06F 9/4856 718/1 |

OTHER PUBLICATIONS

List of IBM Patents or Patent Applications Treated As Related.

Posey, Brien M., "Taking a Fresh Look at Hyper-V Clusters (Part 7)", printed from http://www.virtualizationadmin.com/articles-tutorials/microsoft-hyper-v-articles/load-balancing-high-availability/taking-fresh-look-hyper-v-clusters-part7.html, Jan. 13, 2015.

Lange, Hilton, "Custom Placement Rules and Availability Sets in SCVMM2012 SP1", System Center: Virtual Machine Manager Engineering Blog, printed from http://blogs.technet.com/b/scvmm/archive/2013/03/11/custom-placement-rules-and-availability-sets-in-scvmm-2012-sp1.aspx, Mar. 11, 2015.

VMware, "VM-Host Affinity Rules", VMware vSphere 5.5 Documentation Center, printed from https://pubs.vmware.com/vsphere-55/index.jsp?topic=%2Fcom.vmware.vsphere.resmgmt.doc%2FGUID-2FB90EF5-7733-4095-8B66-F10D6C57B820.html, 2015.

IP.com, "VM Migration based on multi criterion ranking of Hypervisors and Virtual Machines in Software Defined Data Center (SDDC) Environments", IP.com, IPCOM000240063D, Dec. 29, 2014.

Cloudstack open source cloud computing, "11.8. Host Allocation", printed from https://people.apache.org/~ke4qqq/docs2/en-US/Apache_CloudStack/4.0.0-incubating/html-single/Admin_Guide/#host-allocation on Aug. 18, 2015.

* cited by examiner

PLACEMENT OF VIRTUAL MACHINES ON PREFERRED PHYSICAL HOSTS

BACKGROUND

1. Technical Field

This invention generally relates to virtual machines in a computing environment, and more specifically relates to placement of virtual machines on preferred physical hosts in a computing environment based on one or more preferred host identifiers unique to a virtual machine or group of virtual machines.

2. Background Art

Cloud computing is a common expression for distributed computing over a network and can also be used with reference to network-based services such as Infrastructure as a Service (IaaS). IaaS is a cloud based service that provides physical processing resources to run virtual machines (VMs) as a guest for different customers. The virtual machine may host a user application or a server.

A computing environment, such as a cloud computing environment, may have a large number of physical machines that can each host one or more virtual machines. Prior art cloud management tools allow a system administrator to assist in determining a specific physical host in which to place or deploy a new virtual machine. After deployment, the cloud management tools may optimize the system by moving one or more virtual machines to a different physical host. The placement of the new virtual machine initially and during optimization may be determined by a placement policy selected by the system administrator.

BRIEF SUMMARY

An apparatus and method place virtual machines on physical hosts based on a preferred host list that may be generated from preferred host identifiers to more efficiently utilize system resources and serve the needs of different workloads. A host identifiers mechanism allows a system administrator to select preferred host identifiers for each virtual machine or a group of virtual machines. The host identifiers mechanism in conjunction with an optimizer periodically adjusts the placement of virtual machines according to the preferred host identifiers and consistent with optimization policies. A preferred host identifier may include for example a combination of preferred host names, minimum connections, affinity of other virtual machines, etc. Further, the preferred host identifiers may include a time component so that the preferred host resources can be periodically updated and can dynamically change over time.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a mechanism for placement of virtual machines on physical hosts based on a preferred host list that may be generated from preferred host identifiers to more efficiently utilize system resources and serve the needs of different workloads. A host identifiers mechanism allows a system administrator to select preferred host identifiers for each virtual machine or a group of virtual machines. The host identifiers mechanism in conjunction with an optimizer periodically adjusts the placement of virtual machines according to the preferred host identifiers and consistent with optimization policies. A preferred host identifier may include for example a combination of preferred host names, minimum connections, affinity of other virtual machines, etc. Further, the preferred host identifiers may include a time component so that the preferred host resources can be periodically updated and can dynamically change over time.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
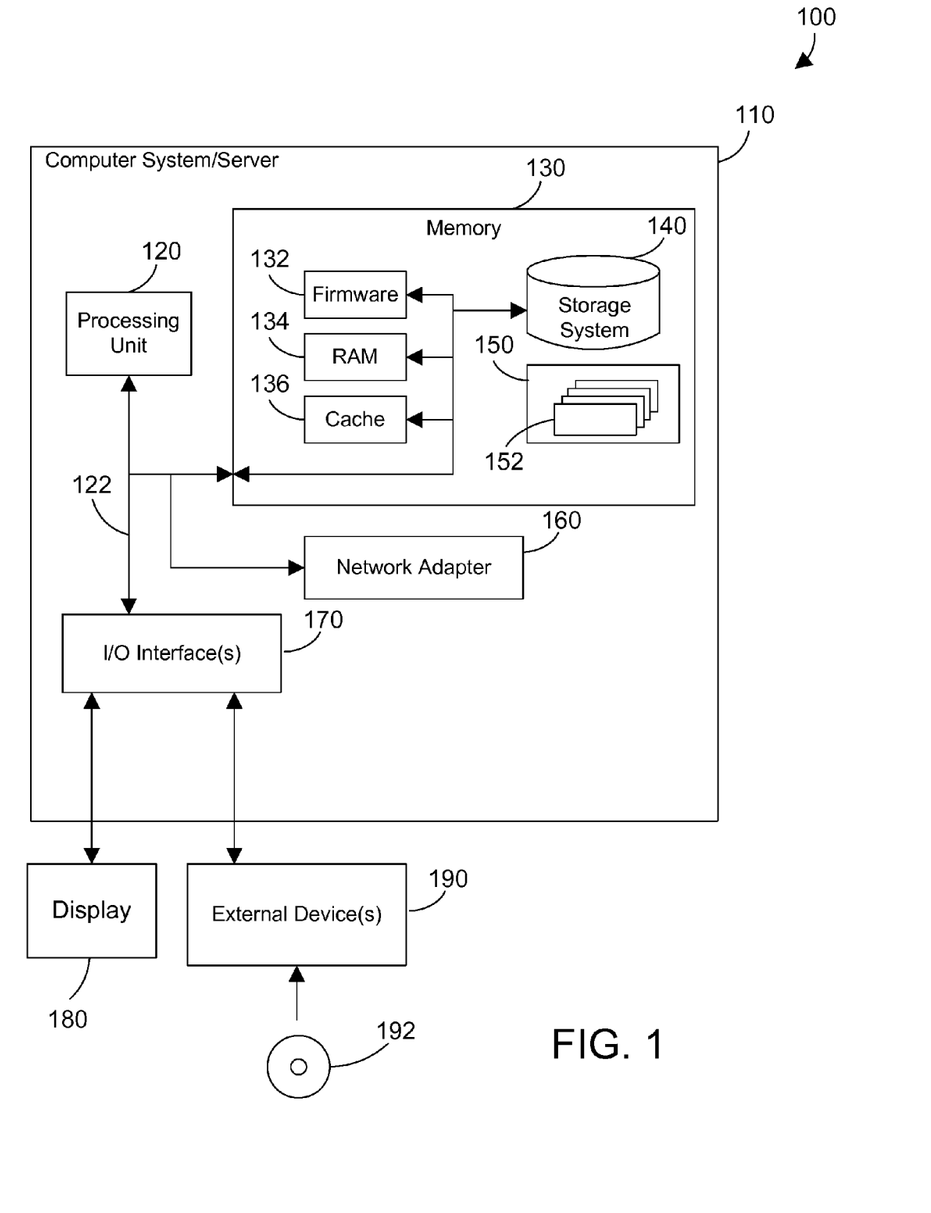
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
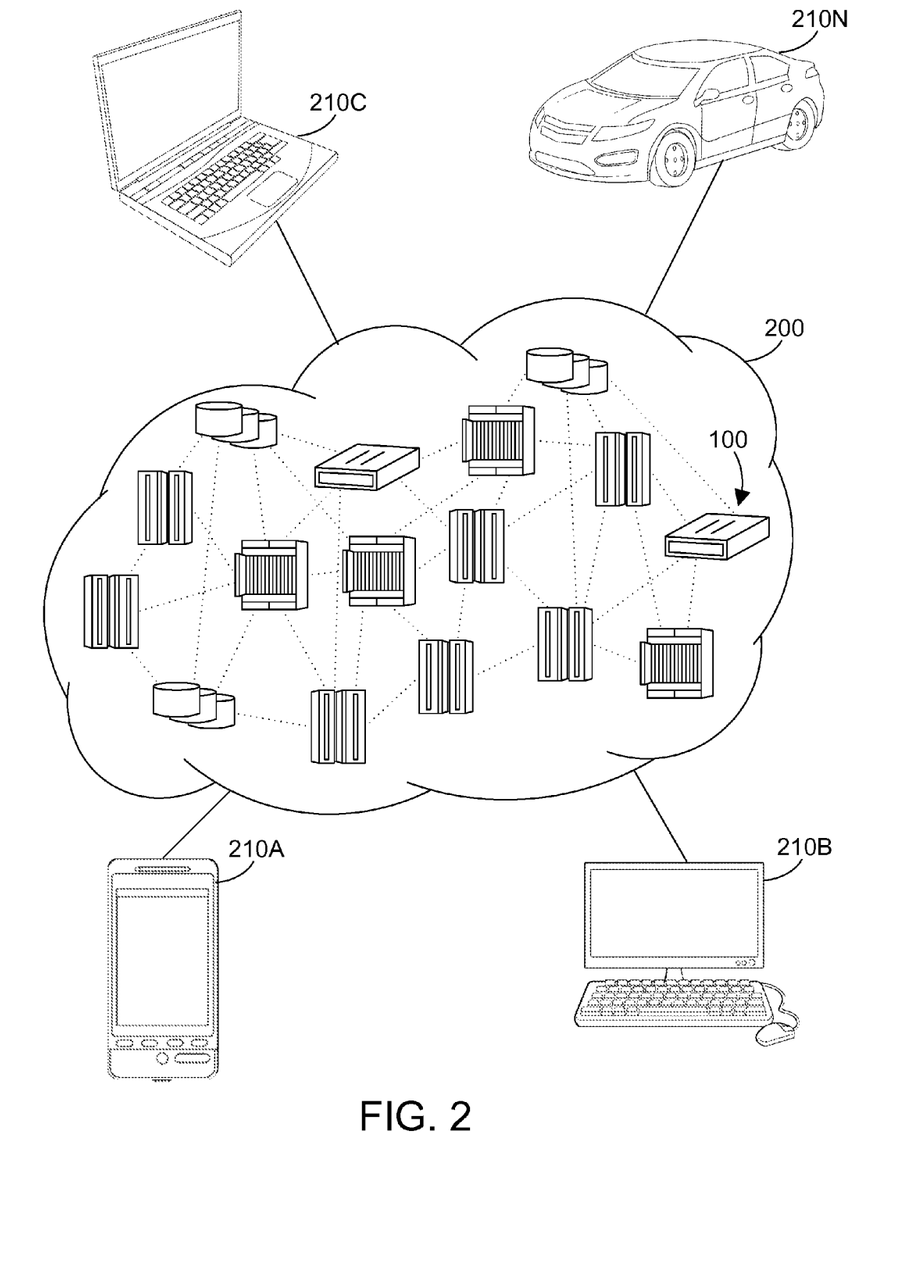
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
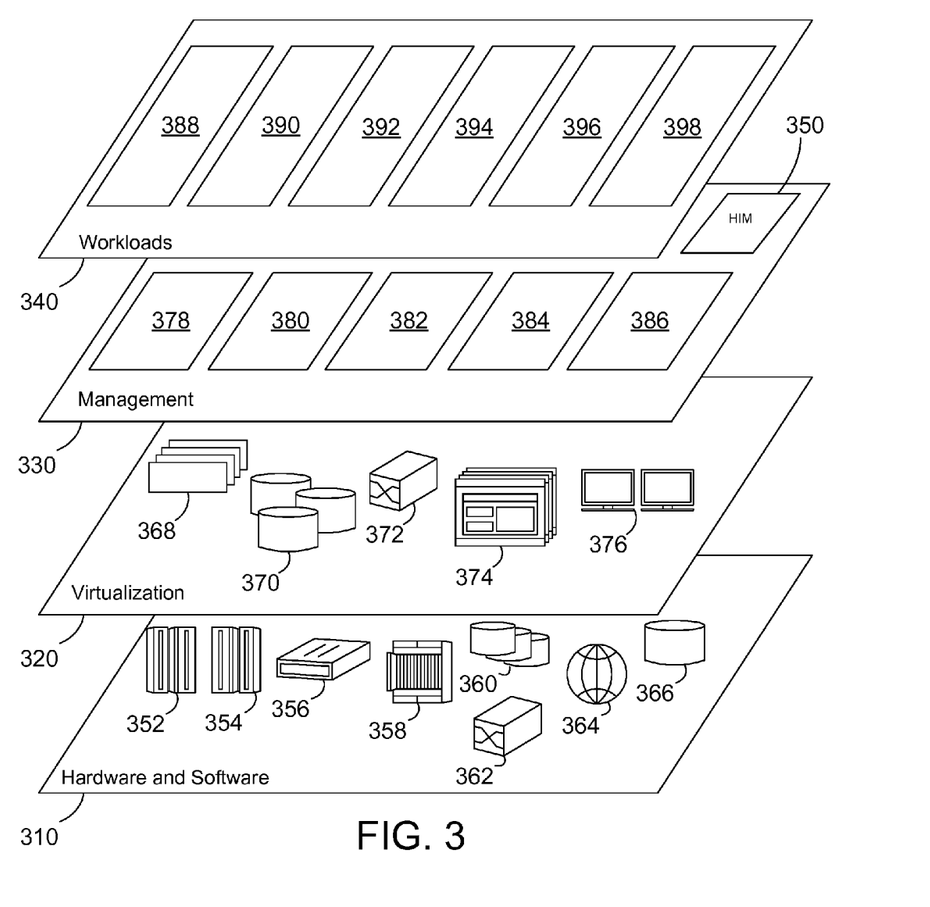
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a host identifiers mechanism (HIM) 350 as described herein. While the HIM 350 is shown in FIG. 3 to reside in the management layer 330, the HIM 350 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
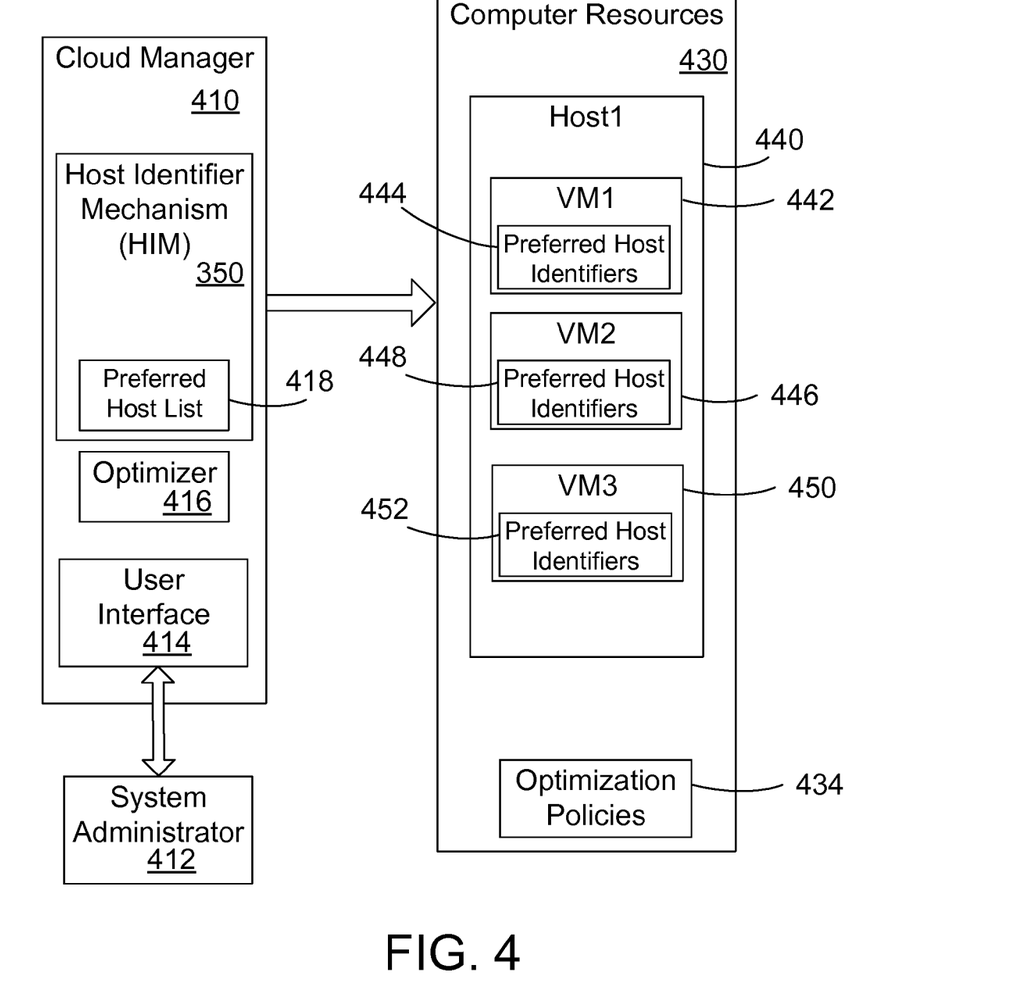
FIG. 4 is a block diagram that illustrates a host identifiers mechanism as described herein that provides placement of virtual machines on physical resources based on preferred host identifiers.

Referring now to FIG. 4, a block diagram illustrates a host identifiers mechanism (HIM) 350 that was introduced above with reference to FIG. 3. The HIM 350 provides placement of virtual machines on physical resources based on a preferred host list generated from preferred host identifiers unique to each virtual machine. In the illustrated example, the HIM 350 is part of a cloud manager 410. The cloud manager 410 may be similar to cloud managers known in the prior art but includes the additional features of the host identifiers mechanism 350 as described herein. The cloud manager 410 allows a human user or system administrator 412 to set up and manage computer resources through a user interface 414. The cloud manager 410 implements the cloud management functions 330 described above with reference to FIG. 3. The host identifiers mechanism 350 may be incorporated into the scheduler (not shown) which manages migration of VM to physical hosts as known in the prior art.

Again referring to FIG. 4, the cloud manager 410 includes an optimizer 416. The optimizer 416 determines an optimum location for the placement of virtual machines for load balancing and other needs of the system. The optimizer 416 may operate similarly to prior art optimizers except as described herein. The optimizer 416 monitors VM and host performance and allows the scheduler (not shown) to migrate VMs to other hosts according to optimization policies 434 set by a system administrator. Placement of a VM as determined by the optimizer 416 may be different than placement determined by the HIM 350 and the preferred host identifiers. This could result in the placement of a VM thrashing back and forth between different locations determined by the optimizer 416 and the HIM 350. Thus, the optimizer 412 and the HIM 350 may need to work together. This may be accomplished by the HIM 350 only migrating the VM based on the preferred host identifiers if it also satisfies the system optimization policies 434. The operation of the host identifiers mechanism 350 is described further below but the examples assume that the host determined by the HIM 350 also meets the requirements of the optimizer 416.

Referring again to FIG. 4, the cloud manager 410 allows the system administrator 412 to set up and manage physical computer resources 430. Computer resources 430 represent physical computer resources such as a physical host computer system in a cloud computing environment. In the illustrated example, the computer resources 430 includes a physical host computer host 1 440. The host computer host1 may be part of a host group (not shown). A host group is a logical grouping of one or more physical computer hosts of the computer resources managed by the cloud manager 410. The computer resources 430 may include a large number of physical computer hosts arranged into one or more host groups. For simplicity, a single host 440 is shown in FIG. 4. The physical computer hosts may be located remotely from the cloud manager. A host is a physical computer accessible over a network to the cloud manager. A host has a hypervisor (software) that allows the host to run one or more virtual machines as known in the prior art. Hosts are described further below.

As shown in FIG. 4, computer resources 430 include one or more hosts represented by host1 440. In this example, host1 400 has three virtual machines, namely: VM1 442, VM2 446 and VM3 450. Each of the virtual machines has one or more preferred host identifiers. VM1 442 has preferred host identifiers 444. Similarly, VM2 446 has preferred host identifiers 448 and VM3 450 has preferred host identifiers 452. In FIG. 4, the preferred host identifiers 444, 448, 452 are shown within their respective virtual machines for illustration purposes. The preferred host identifiers 444,448, 452 are logically associated with the corresponding virtual machine as shown but may physically reside in memory or a file assessable to the host identifiers mechanism 350. For example, preferred host identifiers for one or more of the virtual machines may be optionally located in any location accessible to the cloud manager 410.

As introduced above, the host identifiers mechanism 350 provides placement of virtual machines on physical resources based on preferred host identifiers set by a system administrator. The preferred host identifiers may be an expression or other criteria that describe a preferred host or set of preferred hosts. Each VM, or a perhaps a group of VMs may have a unique set of preferred host identifiers. In the examples shown, the preferred host identifiers are unique to each VM. The preferred host identifiers may be static or may include a time component such that the preferred host will vary with time and circumstances. This allows the preferred host or hosts for each VM to be more than just a static list of hosts. Instead, the preferred host is described by a preferred host identifier that includes one or more expressions that result in a dynamic set of preferred hosts that changes based on environment conditions. A few preferred host identifiers are given herein as examples that could be utilized by host identifiers mechanism 350 described herein. For example, a preferred host identifier for a virtual machine (VM-a) could be as follows: "VM-a is preferably placed on a host with the most backup network connections, otherwise it should be on a host with at least N vCPUs, otherwise it should be on host-1". When the host identifier is evaluated, the results of the evaluation are an ordered set of specific hosts that the VM prefers (i.e., if possible, VM-a should be on host-1, host-2, . . . , host-n). Other detailed examples are given below. Evaluation of the preferred host identifiers for a specific VM may yield a corresponding preferred host list for that VM. The preferred host list 418 may be stored in the HIM as shown in FIG. 4 or some other convenient location.

Figure 5:
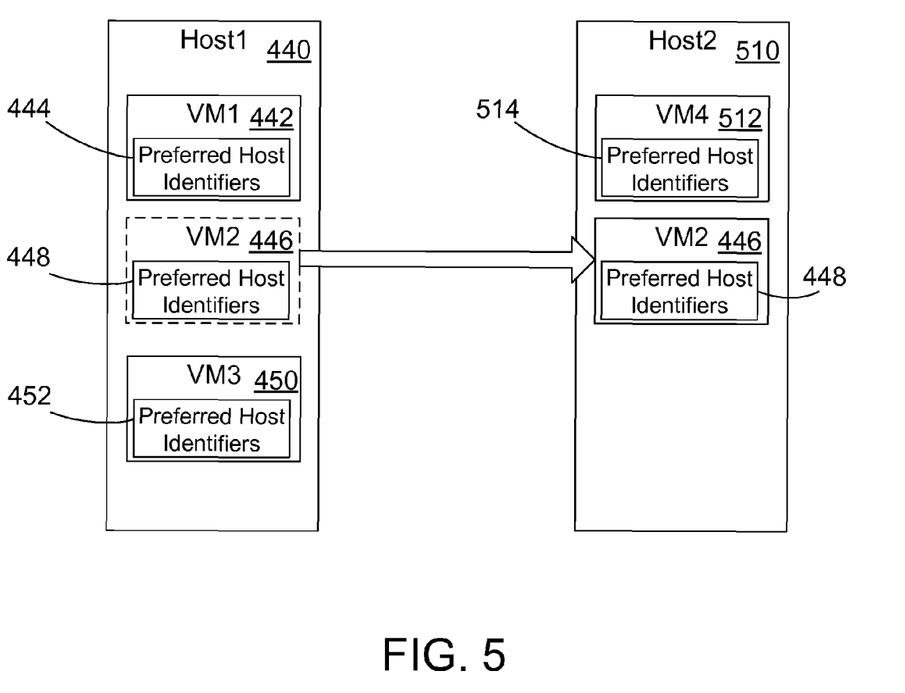
FIG. 5 is a block diagram that illustrates a simplified example of placing virtual machines on host computer resources based on preferred host identifiers.

FIG. 5 is a block diagram that illustrates some examples of placing virtual machines on physical resources as described and claimed herein. For these examples, the host identifiers mechanism HIM 350 (FIG. 4) places virtual machines on a physical host based on preferred host identifiers. As mentioned above, a physical host such as host1 440 may contain one or more virtual machines. For the examples illustrated in FIG. 4, host1 440 initially has the same three virtual machines as shown in FIG. 4 (VM1 440, VM2 446, and VM3 450). A second host, host2 510 initially has a virtual machine VM4 512 that also has preferred host identifiers 514. The HIM 350 periodically evaluates the preferred host identifiers for each of the virtual machines on a physical host. In the following examples, the HIM 350 evaluates the preferred host identifier 448 and determines to move VM2 446 to host 2 510 as shown in FIG. 5. Each example includes a different preferred host identifier 448 and circumstances to illustrate an example of migrating a virtual machine based on a preferred host identifier as claimed herein.

In a first example with reference to FIG. 5, the preferred host identifiers 448 for VM2 446 contain a fixed host name. A preferred host identifier that contains a fixed host name indicates a preference list that defines a specific host. For example, a preferred host identifier may indicate host2 510 as a more preferred host than host1 440 (i.e., host1 is also in the preferred host identifier, but host2 is at a higher rank). An actual example of a preferred host identifier with fixed host names may take the form of: [{'host name': 'host2'}, {'host name': 'host1'}].

In a second example with reference to FIG. 5, the preferred host identifiers 448 for VM2 446 may contain a reference to network connections. Such a preferred host identifier may indicate a preference for a host that has at least a minimum number of network connections. For example, VM2 may have a preferred host identifier that includes a minimum network connections preference because VM2 is very dependent upon network operations and wants failover paths to the network. For example, if host1 440 only has 1 network connection while host2 510 has 1 main network connection and 3 backup connections, then with this preferred host identifier, VM2 would prefer to be on Host2. An actual example of this preferred host identifier may take the form of: [{'min network connections': 3}].

In a third example with reference to FIG. 5, the preferred host identifiers 448 for VM2 446 contains a reference for fibre channel ports. A preferred host identifier concerning fibre channel ports may indicate a preference for a host that has at least a minimum number of fibre channel ports. For this example, we assume VM2 has a preferred host identifier that includes a minimum number of fibre channel ports to a storage provider because VM2 is very dependent upon the storage provider and wants failover paths to the storage provider. For example, if host1 440 only has 2 fibre channel ports available but host2 510 has 6 fibre channel ports available then host2 510 would be placed first on the preferred host list by the HIM. An actual example of this preferred host identifier may take the form of: [{'min_fibre_channel_ports_available': 4}].

In a fourth example with reference to FIG. 5, the preferred host identifiers 448 for VM2 446 contains a reference for affinity. A preferred host identifiers concerning affinity may indicate a preference for a VM to reside on the same host as another specified VM. For this example, if we assume VM2 446 has a preferred host identifier that includes an affinity for VM4 512, meaning it would prefer to reside on the same host as VM4 512. From the figure, since VM4 resides on Host2, VM2 would prefer to reside on Host2. This might be useful for performance reasons if VM2 depends on VM4 for some service. An actual example of this preferred host identifier may take the form of: [{'affinity': 'VM4'}].

In a fifth example with reference to FIG. 5, the preferred host identifiers 448 for VM2 446 contain a reference to licensing. A preferred host identifier concerning licensing may indicate VM2 has a preference for residing on a host with a certain license. The license might allow for some useful hypervisor feature that other hosts don't have. For example, host2 510 has a license that host1 440 does not have. An actual example of this preferred host identifier may take the form of: [{'license': 'XYZ capability'}].

In a sixth example with reference to FIG. 5, the preferred host identifiers 448 for VM2 446 contain a preferred host type. A preferred host identifier with a host type may indicate VM2 has a preference for residing on a certain type of hypervisor (say POWER7+ with some specific level of firmware that improves performance). For example, host2 510 may have the indicated hypervisor type but host 1 440 does not. An actual example of this preferred host identifier may take the form of: [{'hypervisor_type': 'XYZ hypervisor type'}].

In a seventh example with reference to FIG. 5, the preferred host identifiers 448 for VM2 446 contain a timing component. A preferred host identifier may contain a timing component in addition to another component such as those described in the previous examples to describe a preferred host based on time. For example, a timing component could be included with in a preferred host identifier that identifies a fixed or specific host. In this case, the timing component in conjunction with the fixed host name could indicate host2 510 as a more preferred host than host1 440 during a specific time period of a day or week (i.e., host2 510 is the preferred host when run on week days but host1 is the preferred host on Saturday and Sunday). An actual example of this preferred host identifier may take the form of: [{'timing': {'Monday-Friday'}: 'host2'}, {'Saturday-Sunday': 'host1'}}].

Figure 6:
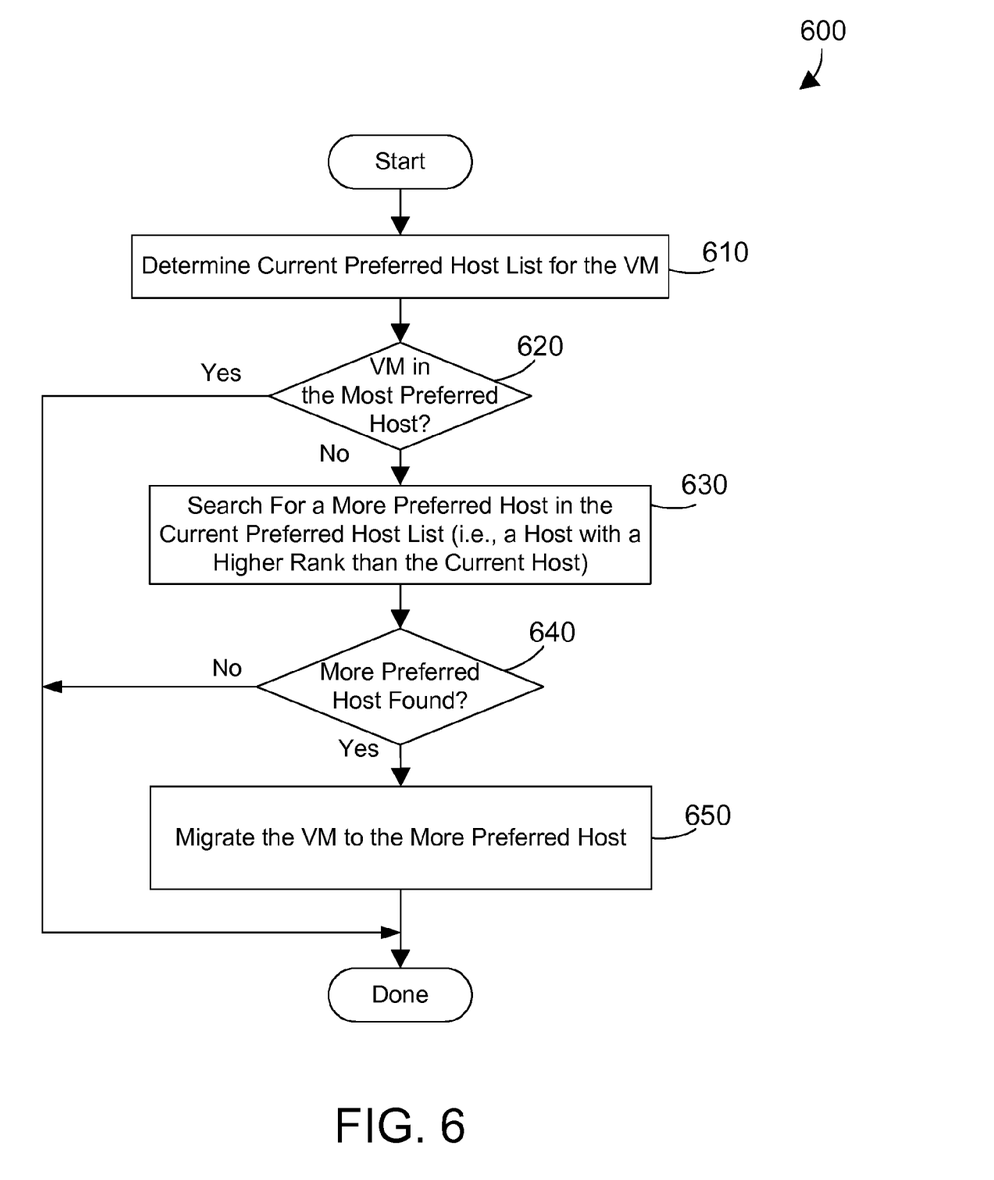
FIG. 6 is a flow diagram of a method for placement of virtual machines on physical resources based on preferred host identifiers as described herein.

FIG. 6 illustrates a flow diagram of a method 600 for placing virtual machines on physical resources based on preferred host identifiers. The method 600 is presented as a series of steps performed by a computer software program such as the host identifiers mechanism 350 described above. First, determine the current preferred host list for the VM (step 610). The preferred host list may be determined from the preferred host identifiers as discussed in detail above. If the VM is in the most preferred host (step 620=yes) then the method is done. If the VM is not in the most preferred host (step 620=no) then search for a more preferred host in the current preferred host list with a higher rank than the current host (step 630). If a more preferred host is not found (step 640=no) then the method is done. If a more preferred host is found (step 640=yes) then migrate the VM to the more preferred host (step 650). The method is then done.

Figure 7:
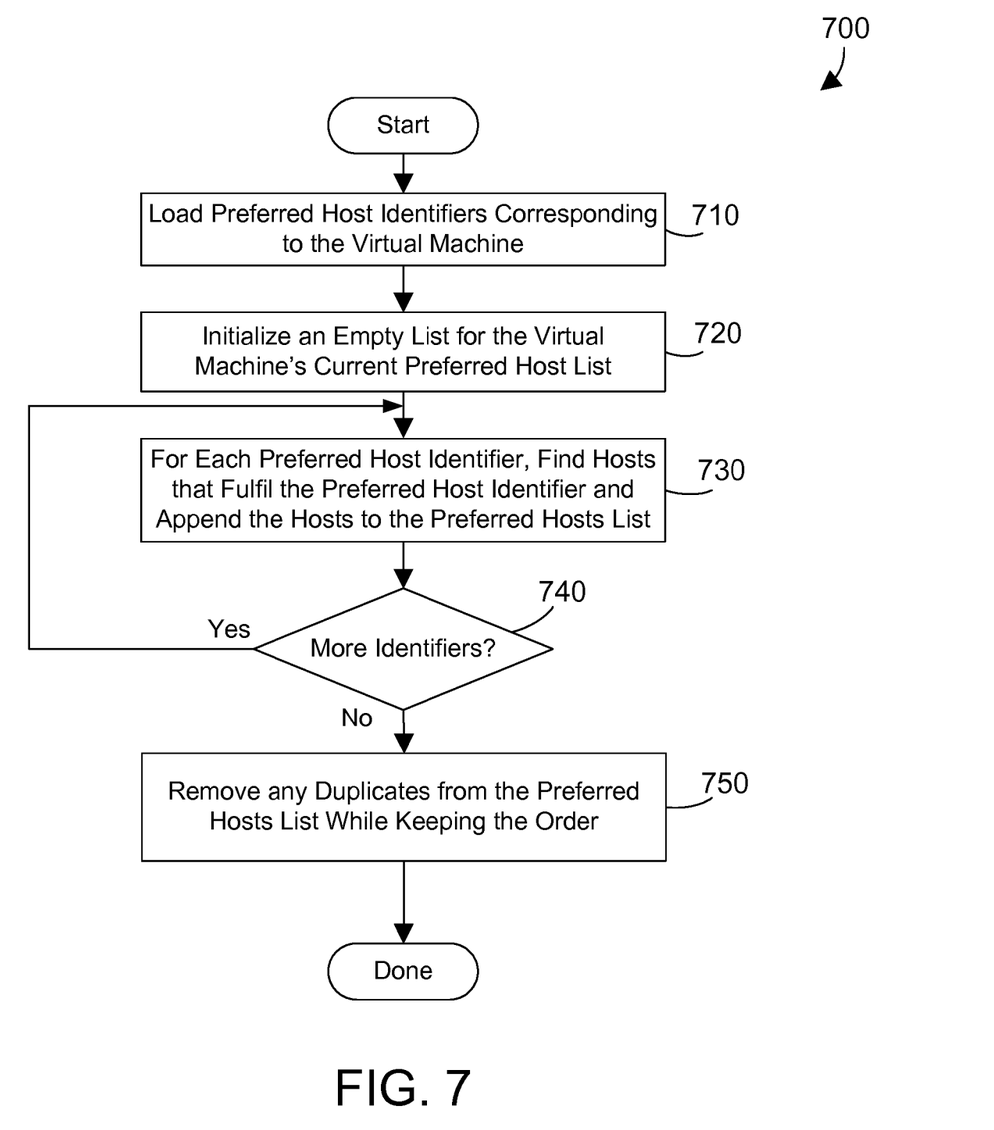
FIG. 7 is a flow diagram of an example method for step 610 in FIG. 6.

Referring now to FIG. 7, a flow diagram shows method 700 that is an exemplary method for performing step 610 in method 600 for determining the current preferred host list using the preferred host identifiers. The method 700 is presented as a series of steps performed by a computer software program such as the host identifiers mechanism 350 described above. First, load the virtual machine's preference preferred host identifiers (step 710). Initialize an empty list for the virtual machine's current preferred host list (step 720). For each preferred host identifier, find hosts that fulfill the preferred host identifiers and append the host to the preferred hosts list (step 730). If there are more preferred host identifiers (step 740=yes) then return to step 730. If there are no more preferred host identifiers (step 740=no) then remove any duplicates from the preferred hosts list while keeping the order of the preferred hosts in the preferred hosts list (step 750) (For example, if the list is [A, A, B, D, B, C, C, A] then the resulting list would be [A, B, D, C]). The method is done.

The claims and disclosure herein provide an apparatus and method for placement of virtual machines on physical resources based on preferred host identifiers for each virtual machine to more efficiently utilize system resources and serve the needs of different workloads.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for placing virtual machines on physical host computer systems, the method comprising:
   providing unique preferred host identifiers for each of a plurality of virtual machines that describe a preferred host or set of preferred hosts for placing a virtual machine corresponding to the preferred host identifiers;
   determining a current preferred host list of a plurality of physical host computer systems for placing the virtual machine based on the preferred host identifiers corresponding to the virtual machine, wherein the preferred host identifiers contain preferences comprising: host name, network connections, fibre channel ports, host type, affinity, and licensing;
   searching for a more preferred host in the current preferred host list for a host with a higher rank than a current host; and
   when a more preferred host is found migrating the virtual machine to the more preferred host.

2. The method of claim 1 wherein the step of finding the current preferred host list comprises:
   loading preferred host identifiers corresponding to the virtual machine;
   initializing an empty list for the virtual machines current preferred host list;
   for each preferred host identifier, finding physical host computer systems that fulfil the preferred host identifiers and appending them to the preferred host list; and
   removing duplicates from the preferred host list while keeping the order of the preferred host list.

3. The method of claim 1 wherein the steps are performed as part of a management layer of a cloud computing environment.

4. The method of claim 1 further comprising repeating the steps for placing virtual machines on physical host computer systems to evaluate the preferred host identifiers corresponding to the virtual machine.

5. The method of claim 1 wherein preferred host identifiers identify a specific physical host as the preferred host for the virtual machine.

6. The method of claim 1 wherein preferred host identifiers identify a time component to migrate the virtual machine to the second physical host.

7. The method of claim 1 wherein preferred host identifiers identify an affinity for the virtual machine to reside on a physical host with a specified virtual machine.

8. The method of claim 1 wherein preferred host identifiers are an expression that when evaluated identify one or more physical hosts to migrate the virtual machine.

9. The method of claim 1 further comprising the step of allowing a system administrator to define the preferred host identifiers, wherein the preferred host identifiers contain a preference for a host identified by a host name.

10. The method of claim 1 further comprising the step of allowing a system administrator to define the preferred host identifiers, wherein the preferred host identifiers contain a preference for a host identified by a host type.

11. A computer-implemented method for placing virtual machines on physical host computer systems, the method comprising:
    providing unique preferred host identifiers for each of a plurality of virtual machines that describe a preferred host or set of preferred hosts for placing a virtual machine corresponding to a preferred host identifier, wherein the preferred host identifier contains preferences comprising: host name, network connections, fibre channel ports, host type, affinity, and licensing;

periodically determining a current preferred host list of a plurality of physical host computer systems for placing the virtual machine based on the preferred host identifiers unique to the virtual machine, comprising:

loading unique preferred host identifiers corresponding to the virtual machine;

initializing an empty list for the virtual machines current preferred host list;

for each preferred host identifier, finding physical host computer systems that fulfil the preferred host identifiers and appending them to the preferred host list; and removing duplicates from the preferred host list while keeping the order of the preferred host list;

searching for a more preferred host in the current preferred host list for a host with a higher rank than a current host; and where a more preferred host is found migrating the virtual machine to the more preferred host.

12. The method of claim 11 wherein preferred host identifiers identify a time component to migrate the virtual machine to the second physical host.

13. The method of claim 11 further comprising the step of allowing a system administrator to define the preferred host identifiers, wherein the preferred host identifiers contain a preference for a host identified by a host name.

14. The method of claim 11 further comprising the step of allowing a system administrator to define the preferred host identifiers, wherein the preferred host identifiers contain a preference for a host identified by a host type.

* * * * *